T. B. SHEFFER.
ANIMAL TRAP.
APPLICATION FILED AUG. 15, 1917.
1,268,166.
Patented June 4, 1918.
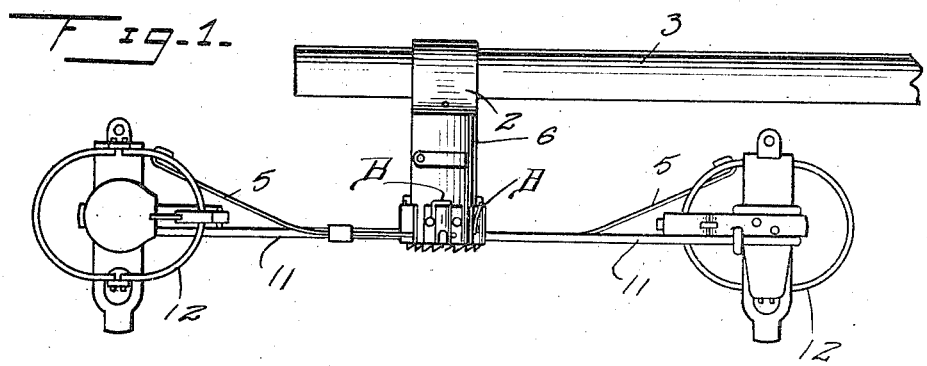
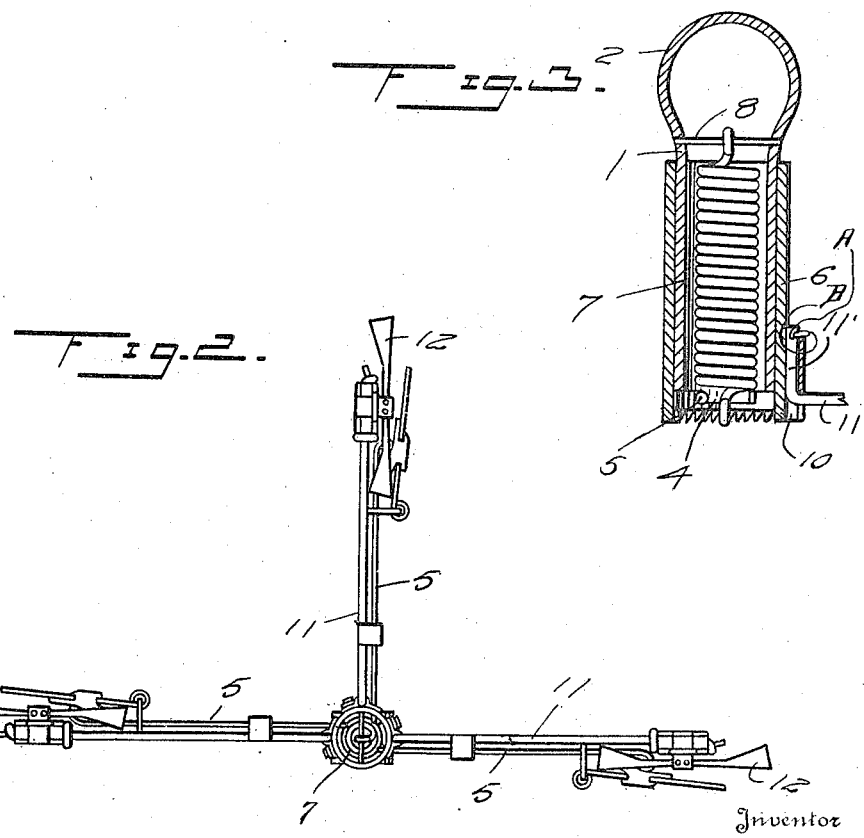
Inventor
Thomas B. Sheffer
By Frederick L. Fishback
Attorney

UNITED STATES PATENT OFFICE.

THOMAS B. SHEFFER, OF ASHTON, IDAHO.

ANIMAL-TRAP.

1,268,166.  Specification of Letters Patent.  Patented June 4, 1918.

Application filed August 15, 1917. Serial No. 186,402.

*To all whom it may concern:*

Be it known that I, THOMAS B. SHEFFER, a citizen of the United States, residing at Ashton, in the county of Fremont and State of Idaho, have invented certain new and useful Improvements in Animal-Traps, of which the following is a specification.

My invention relates to animal traps.

The object of my invention is to produce a device for holding a plurality of jaw traps of ordinary construction in such position that one of the number may be located for catching an animal, and when such trap is sprung it is moved from its original position and another trap shifted into its place for a repetition of such action. A further object thereof is to produce an anchor on which a plurality of animal traps may be radially carried on a plurality of arms and successively moved into and out of desired position by spring pressed means carried in said anchor; and, a further object of my invention is to produce a more simple, cheap and efficient device of the character described than has heretofore been attained.

To these ends my invention includes the combination and arrangement of component parts to be hereinafter described and more particularly pointed out in the claims.

In the accompanying drawings in which like reference characters indicate similar parts, Figure 1 is a vertical view of my invention.

Fig. 2 is a side view thereof.

Fig. 3 is a detail sectional view of the cylindrical anchor for same.

Referring now to the drawings, 1 indicates a cylinder having a loop 2 at one end thereof through which the stake 3 is driven to hold same in fixed position. At the opposite end thereof is provided a projecting shoulder 4 adapted to engage one of a plurality of rods 5 to be hereinafter described.

The cylinder 1 is carried within the outer cylinder 6 adapted to rotate around same, and said cylinders are connected to each other by the coil spring 7, which, as shown, is attached at one end to the cross pin 8 on the inner cylinder and to the cross pin 9 on the outer cylinder.

The outer cylinder, adjacent to its outer end, is provided with a plurality of sockets 10 adapted to receive the bent ends 11′ of the bars 11, on the outer end of each of which an animal trap 12 is carried. The bars 11 are each provided with a groove A to be engaged by the springs B to hold them in place, and permit their removal when desired.

As shown in the drawings, a plurality of animal traps 12 are carried on the radial bars 11. Said traps are of the ordinary jaw type, and one of the jaws of each has a rod 5 attached thereto, the opposite end of which projects through an eye in the outer cylinder 6 in the path of the shoulder 4 on the end of the inner cylinder 1.

In operation, the stake 3 may be driven into the bank of a stream in such position that one of the traps will be positioned beneath or adjacent to the surface of the water. The outer cylinder may then be turned against the tension of the spring imparting a tendency to revolve in the opposite direction when released. The rod 5 of the trap that is placed in desired position will engage the shoulder 4 on the inner cylinder when the trap is set and hold it in desired adjustment. When the trap thus positioned is sprung, the rod 5 thereof is withdrawn from its connection with the cylinders, and the trap with which it is connected is lifted by the rotation of the outer cylinder and the next trap shifted into the place it occupied, and this action may be repeated for the following trap.

Having thus described my invention, what I claim as new and desire to be secured by Letters Patent, is—

1. A device for trapping animals, comprising a member anchored in fixed position, a spring-pressed member rotatably carried thereon, a plurality of animal traps carried on said rotatable member, and means for tripping said rotatable member connected with each of said traps for successively positioning said traps in operative positions.

2. A device for trapping animals, comprising a cylindrical member anchored in fixed position, a spring-pressed cylindrical member rotatably carried thereon, a plurality of animal traps carried on said rotatable member adapted to be successively positioned in operative position, a rod connected with each of said traps and the anchored member for holding one trap in operative position and releasing same when sprung to position a succeeding trap, substantially as described.

3. A device for trapping animals, comprising a cylindrical member anchored in fixed position, a plurality of notches in the outer edge thereof, a spring pressed cylindrical member telescoping said fixed member, a plurality of animal traps radially carried on said outer member on removable arms, a tripping rod connected with each animal trap at one end and engaging said notches at the opposite end adapted to hold its respective trap in operative position when set and permit the rotation of the outer cylindrical member when sprung to place a succeeding trap in operative position, substantially as described.

In testimony whereof I affix my signature in the presence of two witnesses.

THOMAS B. SHEFFER.

Witnesses:
C. RAY ISENBURG,
J. A. McDONALD.

Copies of this patent may be obtained for five cents each, by addressing the "Commissioner of Patents, Washington, D. C."